US012747723B2

(12) United States Patent
Rogg

(10) Patent No.: US 12,747,723 B2
(45) Date of Patent: Sep. 29, 2026

(54) MAIN BEARING UNIT

(71) Applicant: Siemens Gamesa Renewable Energy A/S, Brande (DK)

(72) Inventor: Andreas Rogg, Halstenbek (DE)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 52 days.

(21) Appl. No.: 19/054,138

(22) Filed: Feb. 14, 2025

(65) Prior Publication Data

US 2025/0264089 A1 Aug. 21, 2025

(30) Foreign Application Priority Data

Feb. 21, 2024 (EP) .................................... 24158884

(51) Int. Cl.

| | |
|---|---|
| ***F03D 80/70*** | (2016.01) |
| ***F16C 19/36*** | (2006.01) |
| ***F16C 19/54*** | (2006.01) |
| ***F16C 25/06*** | (2006.01) |
| ***F16C 35/067*** | (2006.01) |
| ***F16C 39/04*** | (2006.01) |

(52) U.S. Cl.

CPC ............ *F03D 80/70* (2016.05); *F16C 19/364* (2013.01); *F16C 25/06* (2013.01); *F16C 35/067* (2013.01); *F16C 39/04* (2013.01); *F05B 2240/50* (2013.01); *F16C 2229/00* (2013.01); *F16C 2300/14* (2013.01); *F16C 2360/31* (2013.01)

(58) Field of Classification Search

CPC ...... F16C 19/364; F16C 19/548; F16C 25/06; F16C 25/08; F16C 35/067; F16C 39/04; F16C 2229/00; F16C 2300/14; F16C 2360/31; F16C 25/083; F03D 80/70; F05B 2240/50

See application file for complete search history.

(56) References Cited

U.S. PATENT DOCUMENTS

| | | | |
|---|---|---|---|
| 10,054,159 | B2 | 8/2018 | Juergen et al. |
| 2011/0037269 | A1 | 2/2011 | Poon et al. |

FOREIGN PATENT DOCUMENTS

| | | | | |
|---|---|---|---|---|
| DE | 102010048546 A1 * | 4/2012 | | ............. F16C 25/08 |
| DE | 102020133993 A1 | 6/2022 | | |
| DE | 102021204286 A1 | 11/2022 | | |
| EP | 3489534 A1 * | 5/2019 | | ............. F16B 39/30 |
| WO | WO-2012097962 A2 * | 7/2012 | | ........... F16C 27/066 |

OTHER PUBLICATIONS

European Search Report dated Jul. 25, 2024 corresponding to European Application No. 24158884.7.

* cited by examiner

*Primary Examiner* — Phillip A Johnson

(57) ABSTRACT

A main bearing unit of a wind turbine drivetrain, including a tapered roller bearing arranged between a housing of the main bearing unit and the low-speed shaft of the drivetrain; a press-fit connection between an inner surface of the housing and the outer surface of the bearing cup; and facilitating axial displacement of the bearing cup to reinstate preload force on the bearing. A method of reinstating a preload force in a bearing of such a main bearing unit.

16 Claims, 10 Drawing Sheets

II-II

MAIN BEARING UNIT

CROSS-REFERENCE TO RELATED APPLICATIONS

This application claims priority to EP application Ser. No. 24158884.7, having a filing date of Feb. 21, 2024, the entire contents of which are hereby incorporated by reference.

FIELD OF TECHNOLOGY

The following relates to a main bearing unit.

BACKGROUND

In an established type of wind turbine drivetrain, the low-speed shaft (or "main shaft") is turned by the aerodynamic rotor, and connected to the drive end of a gearbox. The aerodynamic rotor comprises rotor blades mounted to a hub, which in turn is connected to the drive end of the low-speed shaft. The low-speed shaft is supported in a housing by a bearing arrangement. In a well-known configuration, this comprises a matched pair of tapered roller bearings, with the "upwind" bearing installed about the front or drive end of the main shaft, and the "downwind" bearing installed about the rear or non-drive end of the shaft. A tapered roller bearing comprises an inner ring (the "cone"), an outer ring (the "cup") and tapered rollers arranged in a cage between the cone and the cup. The purpose of the bearings is to support the weight of the aerodynamic rotor at all times. In a matched pair configuration, the load direction on the front bearing is "downwards", while the load direction on the rear bearing is "upwards".

The bearings are generally preloaded, since failure-free operation of the bearings requires that a minimum preload is maintained over the lifetime of the wind turbine. In the existing configurations, the bearing lifetime would typically exceed the service life of the wind turbine, so that it has not been necessary to facilitate maintenance procedures to exchange the main bearing unit or to reinstate the bearing preload. Instead, the established practice has been to engineer the main bearing unit according to the expected service life of the corresponding wind turbine.

However, the service life of present-day wind turbines has been extended significantly, from 20 years (older wind turbines) to 25-35 years (modern wind turbines), and it is desirable that major components such as the main bearing unit should have a corresponding extended service life or "fatigue life".

It is known to preload a wind turbine main bearing unit during assembly to a level that includes margins for assembly tolerance, measurement tolerance, settlement, creep, wear and relaxation over the bearing's estimated service life. Since these margins are chosen to cover rarely occurring worst case situations, even a conservative preload level is already quite large, and a significant share of the fatigue damage that limits the service life arises from bearing preload. However, it is generally not possible to extend the service life of a main bearing unit by lowering the initial preload level with the aim of mitigating fatigue from preload, since insufficient preload leads to other types of wear that unavoidably result in premature fatigue damage.

Therefore, the longer service life of a wind turbine leads to problems with the main bearing unit, since the bearing preload levels, which make it possible to avoid service issues during a "short" wind turbine service life (ca. 20 years), cannot be decreased to extend the bearing service life to match a "long" wind turbine service life (e.g., 25-35 years).

One way of increasing the fatigue or service lifetime of a main bearing is to make it larger, i.e., by increasing the overall dimensions of the rollers, races, bearing housing, etc. However, the costs of engineering the main bearing unit to the longer service life of a modern wind turbine adds significantly to the cost of the wind turbine.

SUMMARY

An aspect relates to overcoming the problems outlined above.

This aspect is achieved by the main bearing unit; by the method of reinstating a preload force in a bearing of a main bearing unit; and by the wind turbine.

While the inventive main bearing unit could be used in various types of drivetrain, it is particularly suited for use in the drivetrain of a wind turbine. The inventive main bearing unit could be used in a direct-drive generator connected to the main shaft. In the following, without restricting embodiments of the invention in any way, it may be assumed that the main bearing unit is constructed for use in a wind turbine drivetrain comprising a low-speed shaft arranged to drive a high-speed unit comprising a gearbox and a generator. The bearing arrangement can be assumed to comprise a matched pair of tapered roller bearings in a suitable configuration such as an "O" configuration, with a front bearing at the drive end and a rear bearing at the non-drive end. In such a configuration, the bearing front faces are directed "outward", and the bearing back faces are directed "inward", i.e., the back faces of the rear bearing cup and cone are directed towards the drive end of the main shaft; the back faces of the front bearing cup and cone are directed towards the non-drive end of the main shaft.

According to embodiments of the invention, the main bearing unit of a wind turbine drivetrain comprises one or more tapered roller bearings arranged between a housing of the main bearing unit and the low-speed shaft of the drivetrain; a press-fit connection between an inner surface of the housing and the essentially cylindrical outer surface of the bearing cup; and an axial displacement means, i.e., applying an axial force against a bearing cup back face to effect an axial displacement of that bearing cup in order to reinstate the preload force on the bearing.

An advantage of the inventive main bearing unit is that the configuration is economical to manufacture and allows the bearing preload force to be reinstated at any time during the service life of the main bearing unit. As will be explained below, the bearing preload can be reinstated in a straightforward manner, without needing to gain access from the non-drive end of the main bearing unit.

A further advantage of the inventive main bearing unit is that the design elements or means to facilitate a preload reinstatement procedure need only occupy a favorably small amount of space. In embodiments, the region "behind" the bearing, e.g., the region downwind of the rear bearing, can remain entirely unaffected by any aspects of bearing preload, neither for permanently installed parts nor for tools deployed during a preload reinstatement procedure. The distance between the rear bearing and the coupling/gearbox can therefore be favorably short, so that the drivetrain can be realized in a favorably compact manner. A compact drivetrain is generally desirable for various reasons. For example, structurally-borne vibrations that are transferred from the gearbox and generator through the main bearing unit to the nacelle bedplate can be significantly reduced in a configuration that has only a short distance between the rear bearing and the coupling/gearbox. A drivetrain design that can shorten the distance between rear main bearing and gearbox can exploit this by increasing the distance between the front and rear bearing, which in turn favorably reduces bearing loads.

According to embodiments of the invention, the method of reinstating a preload force in a bearing of such a main bearing unit comprises the steps of relieving a press fit force between the housing and the bearing cup outer surface; applying an axial force to the bearing cup back face to axially displace the bearing cup from its initial position to a final position; and subsequently fixing that bearing cup at its final position.

According to embodiments of the invention, the wind turbine comprises a drivetrain with an instance of the inventive main bearing unit. The costs associated with manufacture and maintenance of the main bearing unit can be kept favorably low. This is because the initial preload force need not be excessively high, since the preload force can be reinstated at any time during the service life of the wind turbine; furthermore, the preload reinstatement procedure can be performed at relatively low cost since there is no need to dismantle any part of the drivetrain. Manufacturing costs can be kept low, since it is not necessary to form a trapezoidal thread about the rotor shaft to receive a correspondingly threaded lock nut.

In the following, the rotation axis of the drivetrain shall be regarded as "horizontal" for the purpose of discussion (in a wind turbine, the drivetrain is generally tilted by a few degrees to avoid collisions between the rotor blades and the tower), and any reference to a "vertical" face of a bearing ring or other part shall be understood as being vertical relative to the horizontal axis of rotation.

For the sake of simplicity, the inventive method of reinstating preload force is described in terms of the rear bearing but shall be understood to apply equally to the front bearing.

In a particularly desired embodiment of the invention, the main bearing unit comprises an additional annular component, arranged in the housing so that it abuts the bearing cup back face. This additional annular component is referred to herein as a "preload ring", since its purpose is to assist in maintaining and reinstating the bearing preload force. The preload ring is dimensioned to fit tightly inside the housing and to abut the back face of the bearing cup. The preload ring can be held in place by a suitable housing feature. For example, in a particularly desired embodiment of the invention, the housing comprises a flange that projects radially inward into the housing interior, and which is located at a distance from the bearing cup back face. The preload ring fits tightly in the gap between flange and bearing cup, and this tight fit can be achieved in a number of ways as will be explained below.

A press-fit between the housing flange and the preload ring ensures that the preload ring presses against the bearing cup in the axial direction, so that the preload ring constantly applies the desired preload force against the bearing cup and supports the axial bearing loads during turbine operation. In a particularly desired embodiment of the invention, a vertical outer face of the preload ring is in direct contact with the vertical back face of the bearing outer ring or cup. In an embodiment, the contact face of the preload ring essentially matches the annular shape of the bearing cup back face, so that the outer face of the preload ring and the bearing cup back face are in complete contact. The outer diameters of the bearing cup back face and the preload ring can be essentially identical, so that the cylindrical outer surfaces of each of these annular component is in direct contact with the cylindrical interior surface of the housing. The inner diameters of the bearing cup back face and the preload ring can also be essentially identical. Alternatively, the inner diameter of the preload ring can be somewhat smaller than the inner diameter of the bearing cup back face.

As indicated above, the bearing arrangement of a wind turbine drivetrain generally comprises a matched pair of tapered roller bearings, with a front bearing at the drive end, and a rear bearing at the non-drive end of the shaft. A configuration of housing flange, preload ring and axial adjustment means can be deployed at the rear bearing. Alternatively or in addition, a mirrored configuration of housing flange, preload ring and axial adjustment means can be deployed at the front bearing.

When equipped with a preload ring as described above, the inventive main bearing unit is designed so that, when the main bearing unit is initially assembled, the preload ring is placed to apply the required preload force on the bearing. Later on, during the service life of the wind turbine, the preload force may decrease slightly owing to factors such as settlement, creep, wear, relaxation, etc. As explained above, even a slight deterioration in the preload force can significantly reduce the lifetime of the bearing. The inventive main bearing unit is designed so that, during the service life of the wind turbine, the bearing preload can be reinstated in a relatively straightforward procedure, by axially displacing the preload ring and thereby also axially displacing the bearing cup and then securing the preload ring at its new position. In this way, by displacing the bearing cup relative to the fixed bearing cone, the preload force is reinstated.

In a particularly desired embodiment of the invention, the axial displacement is effected by deploying one or more sets of shims. A shim set shall be understood to comprise a plurality of shims of equal thickness. For example, the shims of a shim set can each be 0.5 mm (or 0.2 mm, 0.1 mm etc.) thick so that this shim set can be used to displace the bearing cup by 0.5 mm (by 0.2 mm, by 0.1 mm etc.). In an embodiment, shims are made of a resilient material such as steel.

In the following, for the sake of clarity, it may be assumed that the main bearing unit is realized to include a preload ring. In a desired embodiment of the invention, the housing of the main bearing unit comprises a plurality of openings positioned to coincide with the "bearing-side face" of the housing flange, e.g., immediately downwind of the housing flange and immediately upwind of the preload ring. Each opening is shaped to receive a number of shims, which can be inserted into the space between housing flange and preload ring. For example, when the main bearing unit is initially assembled, the bearing preload force can be achieved by the preload ring alone, or by the preload ring in combination with shims of a first shim set. During the service life of the wind turbine, a reduction in bearing preload force can be remedied by axially displacing the preload ring by a predetermined amount, thereby creating a slight gap upwind of the preload ring and inserting shims of a suitable shim set to "fill" the gap. In an embodiment, the shim outer surfaces are polished to a smooth finish in order to facilitate insertion/removal. The thicker shim arrangement now holds the preload ring in its new position, in which it once again applies the desired preload force to the bearing cup. In an embodiment, the step of axially displacing the preload ring can be done by first relieving the press-fit between bearing cup and housing and then using one or more hydraulic tools to apply pressure against the preload ring to move it (and the bearing cup) in the axial direction. To this end, the housing can comprise suitable openings (alternating with the shim recesses, for example), so that a hydraulic tool can be arranged in each opening, upwind of the preload ring. In an embodiment, during the preload reinstatement procedure, the main shaft (together with the bearing cone) is rotated to ensure that axial displacement of the bearing cup is done uniformly and without incurring damage to the bearing rollers and raceways.

Instead of effecting the desired axial displacement by inserting shims, the desired axial displacement can be effected by removing shims. To this end, in a desired embodiment of the invention, the inwardly projecting housing flange comprises an annular arrangement of axial through-holes or bores to receive a corresponding number of axial displacement means, for example threaded fasteners such as stud bolts, each with a shaft or shank that extends to the preload ring. Each of these can be inserted into a bore from the upwind face of the housing flange and extends through the bore so that its end face makes contact with the upwind face of the preload ring. In a desired embodiment of the invention, a bore has an internal thread over at least some of its length to engage with a threaded fastener. At the upwind face of the housing flange, the fastener can terminate in a hexagonal head so that it can be turned using a torque wrench. In an embodiment, the shims can have the shape of washers that are placed between the head of the fastener and the upwind face of the housing flange. When the main bearing unit is initially assembled, the bearing preload force can be achieved by arranging a stack of shims (or a single sufficiently thick shim) under each fastener head and tightening the fasteners so that their outer ends exert the required preload force on the preload ring (which transfers the preload force to the bearing cup).

During the service life of the wind turbine, a reduction in bearing preload force can be remedied by removing the threaded fasteners, and replacing the previous shim(s) by a shim or shim stack that is slightly thinner. After completing this step for all fasteners, these are tightened again. For example, a 0.5 mm shim can be removed from underneath each fastener head and replaced by a 0.3 mm shim, to move the preload ring (and bearing cup) by 0.2 mm in the downwind direction. In this case also, the press-fit between bearing cup and housing is relieved in an initial step; during the preload reinstatement procedure, the main shaft (together with the bearing cone) is rotated to ensure that axial displacement of the bearing cup is done uniformly and without incurring damage to the bearing rollers and raceways.

The embodiments described above can be combined, for example an annular arrangement of stud bolts can be provided with an initial shim arrangement for setting the preload force when the main bearing unit is manufactured. The housing can also have an annular arrangement of openings so that additional shims can be added as required during the service life of the wind turbine.

The preload ring described above can serve to distribute axially-directed forces evenly over the vertical face of the bearing cup so that, during a preload reinstatement procedure, the preload ring facilitates displacement of the bearing cup. However, the inventive approach can be implemented without such a preload ring: instead, in an embodiment in which shims are carried by stud bolts, the bolt ends can apply the requisite axial force directly against the bearing cup end face; in an embodiment in which shims are inserted in housing recesses, the shims can be inserted directly between housing flange and bearing cup end face to achieve a desired axially-directed press-fit force.

For the initial step of relieving the press-fit between bearing cup and housing, the housing of the main bearing unit comprises a number of passages arranged to convey a pressurized fluid to one or more regions between the inner surface of the housing and the outer surface of the bearing cup. A hydraulic system can be deployed to establish a fluid cushion in the extremely narrow space at each of these regions. For example, a hydraulic system can comprise a pressurized fluid supply and hoses for conveying the pressurized fluid to each region. The pressurized fluid effectively breaks the press-fit between the housing interior surface and the bearing, so that uniform axial displacement of the bearing (by adding or removing shims as described above) is facilitated while turning the main shaft and bearing inner ring. The front and rear bearings must continue to support the weight of the aerodynamic rotor during the preload reinstatement procedure also, i.e., the load direction is downwards in the front main bearing, and upwards in the rear bearing.

In a desired embodiment of the invention, the passages are arranged so that multiple fluid cushions with individually adjusted hydraulic pressure levels can be established as required about the rear bearing. For example, a "thicker" fluid cushion in the upper regions of the rear bearing can facilitate displacement of that bearing. The pressure levels are carefully chosen to ensure that, during axial displacement of the rear bearing, it continues to fulfil its function in supporting the aerodynamic rotor.

Alternatively or in addition, the housing of the main bearing unit could be heated to effect an expansion, thereby reducing the press-fit between bearing cup and housing.

BRIEF DESCRIPTION

Some of the embodiments will be described in detail, with reference to the following figures, wherein like designations denote like members, wherein.

DETAILED DESCRIPTION

Figure 1:
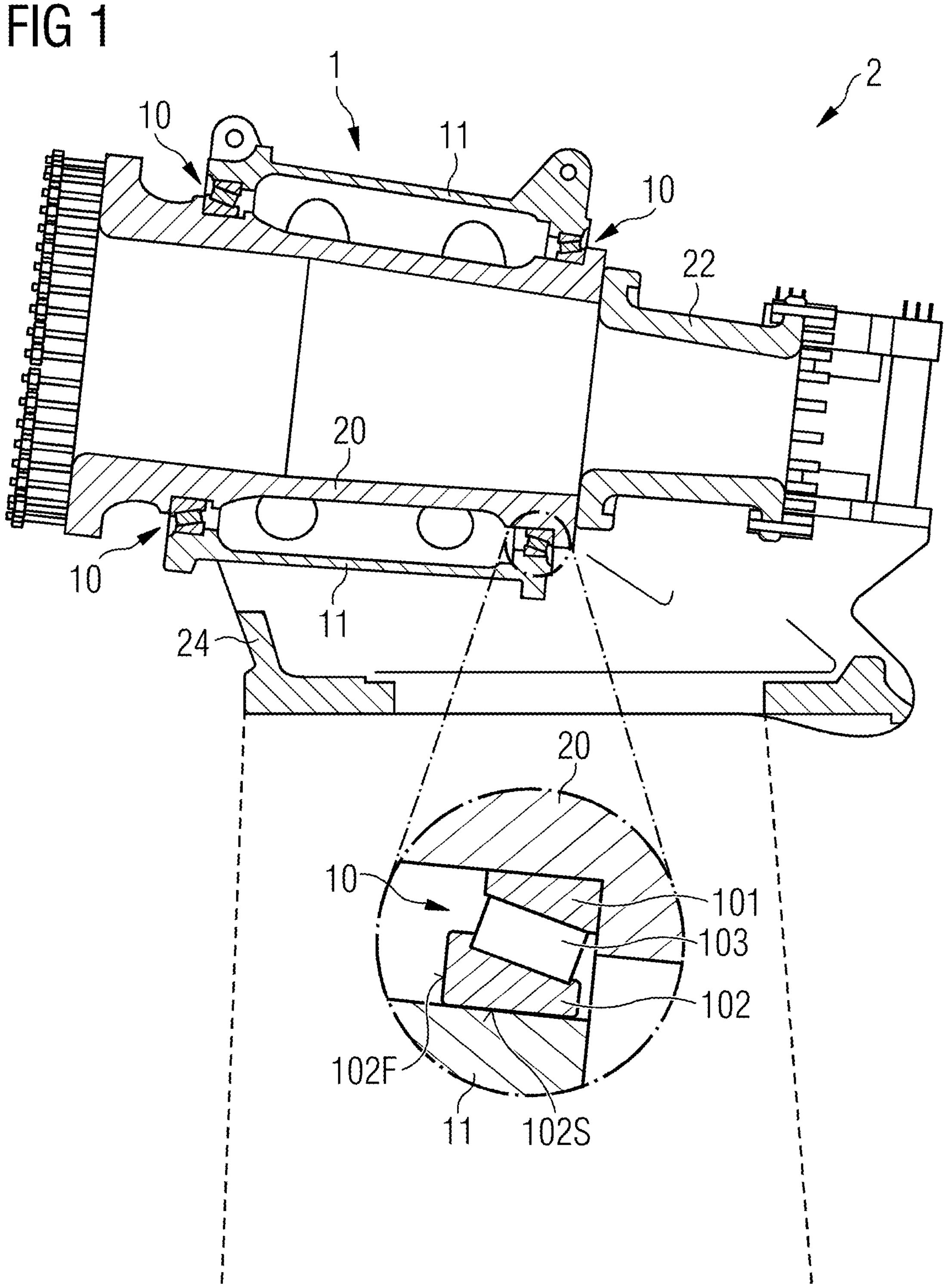
FIG. 1 shows a main bearing unit of a wind turbine drivetrain.

FIG. 1 shows a cross-section through part of a wind turbine drivetrain 2, showing a main bearing unit 1 in place about a low-speed shaft 20, and a coupling interface 22 at the downwind end of the shaft 20 for connection to the next stage of the drivetrain 2. The main bearing unit 1 is in place about the low-speed shaft 20 and comprises a matched pair of tapered roller bearings 10 enclosed in a bearing housing 11. In this exemplary embodiment, the housing 11 is secured to a bedplate 24 with a flat base for mounting to the top of a wind turbine tower (indicated by ghost lines). Each bearing 10 comprises tapered rollers 103 arranged between an inner ring or "cone" 101 and an outer ring or "cup" 102.

Figure 2:
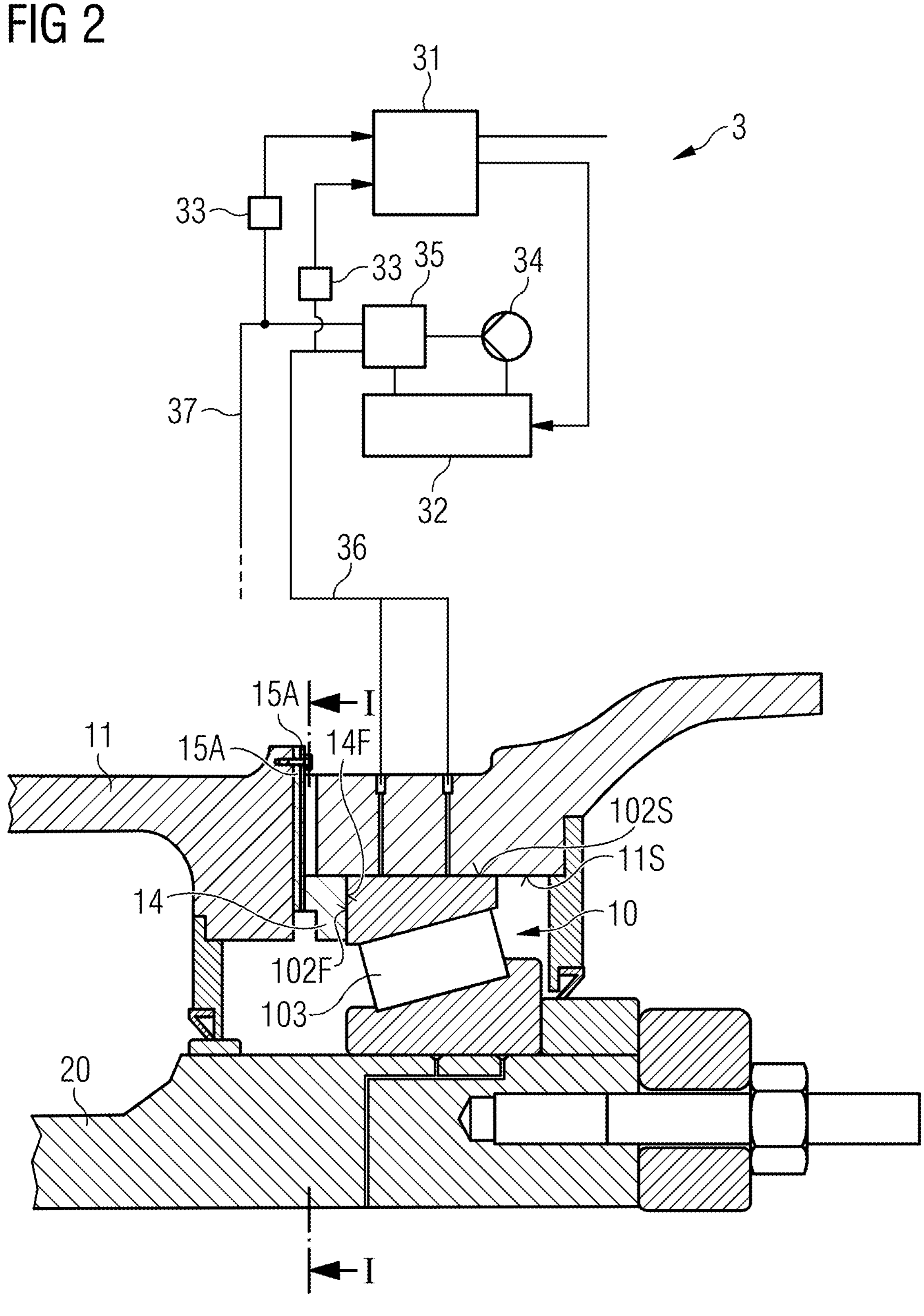
FIG. 2 illustrates a first embodiment of the inventive main bearing unit in which shims are added during a preload reinstatement procedure.
Figure 3:
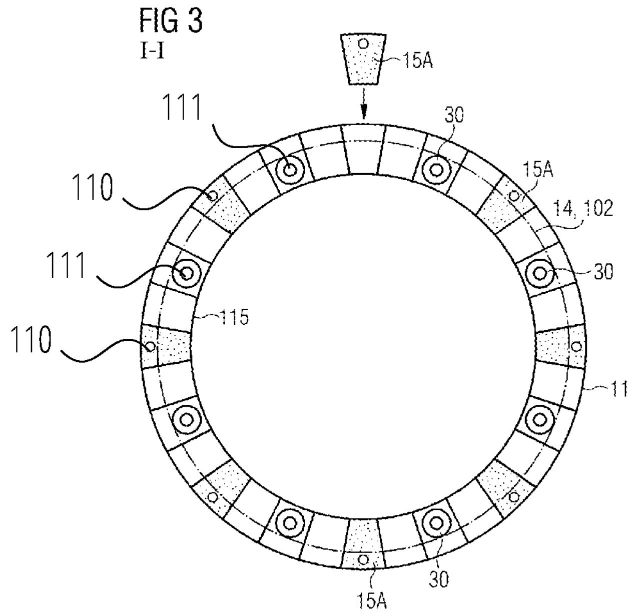
FIG. 3 illustrates the first embodiment of the inventive main bearing unit in which shims are added during a preload reinstatement procedure.
Figure 4:
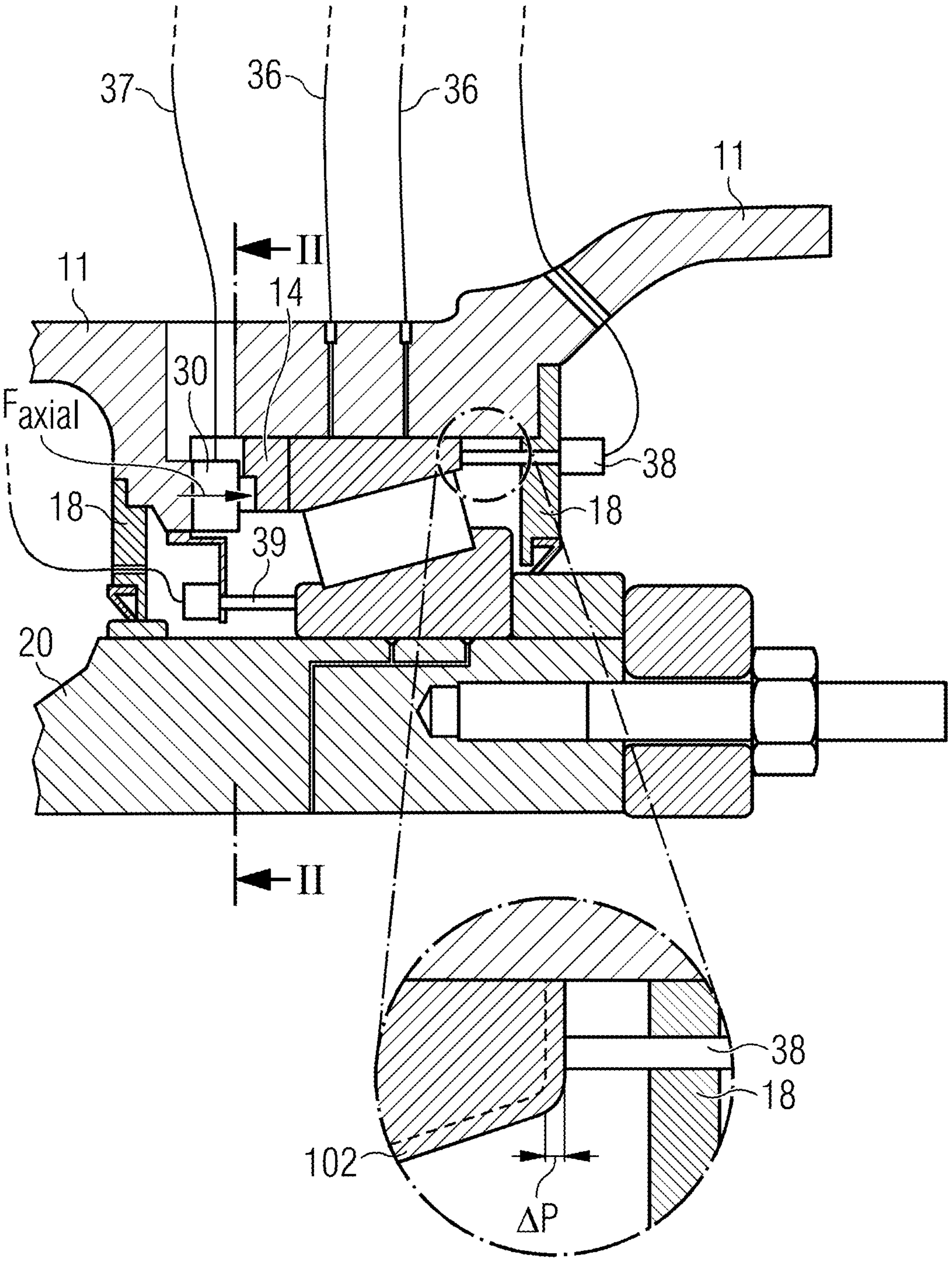
FIG. 4 illustrates the first embodiment of the inventive main bearing unit in which shims are added during a preload reinstatement procedure.

FIGS. 2-4 illustrate an embodiment of the inventive main bearing unit 1 in which shims 15A are added during a preload reinstatement procedure. FIG. 2 shows the rear bearing 10 arranged to abut against a fixed annular ring 14 arranged about the non-drive end of the main shaft 20, and the housing 11 of the main bearing unit 1, with seals 18 to prevent contaminants from entering or leaving the bearing space. The inner surface of the bearing inner ring or cone 101 fits closely about the low-speed shaft 20, i.e., there is a press-fit connection between the bearing cone 101 and the low-speed shaft 20.

FIG. 2 shows a preload ring 14 in a press-fit between the bearing cup 102 and an inwardly projecting housing flange 115, in this case the press-fit is achieved by a stack of shims 15A. One or both of these shims 15A can have been inserted during a preload reinstatement procedure as will be explained in the following.

FIG. 3 is a simplified view of the main bearing unit 1 in cross-section I-I (looking in the upwind direction) to illustrate how the housing 11 may be designed to receive the shims 15A and also to receive hydraulic jacks 30 during a preload reinstatement procedure. The outer diameter of the preload ring 14 and bearing cup 102 is indicated by the dashed line. The diagram shows an annular arrangement of shim insertion openings 110, in this case eight are arranged about the housing 11 so that (in this case) a set of eight (identical) shims 15A may be inserted. The insertion openings 110 can be equidistantly arranged as indicated, although this is not strictly necessary. The diagram shows an annular arrangement of tool openings 111, in this case eight such recesses or openings are arranged about the housing 11 so that hydraulic jacks 30 can be placed to exert force in the downwind direction against the preload ring 14 (and bearing cup). During this step, the main shaft 20 is turned together with the bearing cone 101. This step is facilitated by fluid cushion between bearing cup 102 and housing 11, established using a hydraulic circuit 3 as shown in FIG. 2. The hydraulic circuit 3 includes a pump 34, a control valve arrangement 35, various sensors 33, a controller 31 and a power supply 32. Hydraulic lines 36 convey pressurized fluid through passages 11P in the housing 11, creating a fluid cushion at one or more regions between housing 11 and bearing cup 102. This is done to facilitate axial displacement of the bearing cup 102 as illustrated in FIG. 4 when the hydraulic jacks 30 are actuated to exert a force $F_{axial}$ against the preload ring 14, displacing it—and therefore also the bearing cup 102—by a desired amount ΔP as indicated in the enlarged portion. The displacement ΔP—which may be in the order of only a few millimeters or even less—can be monitored using a suitable sensor arrangement 38 as indicated. For example, proximity sensors 38 can be deployed (placed in suitable openings in a seal 18, and with wires leading to the controller 31 of the hydraulic system 3) to determine the progress of the axial displacement step so that actuation of the hydraulic jacks 30 can be done in a very precise manner. A minimum of three sensors 38 can be sufficient to measure the axial displacement ΔP, and can be used to ensure that the bearing cup front face is perpendicular to the rotational axis. Further proximity sensors 39 can be arranged against the bearing cone back face as shown. These sensors 39 can be used to measure the elongation of the shaft 20. The difference between measurements reported by the sensors 38, 39 can be used to determine the extent of compression of the bearing 10 (the rollers 103 behave as spring elements), allowing the preload force $F_{preload}$ to be determined. After displacing the bearing cup 102 and preload ring 14, suitable shims 15 are inserted to fill the newly created gap, thus fixing the bearing cup 102 at its new position. The hydraulic tools 30 are removed from the housing 11, and the controller 31 controls the relevant system components 34, 35 to remove the fluid cushion between housing 11 and bearing cup 102, thereby completing the preload reinstatement procedure.

Figure 5:
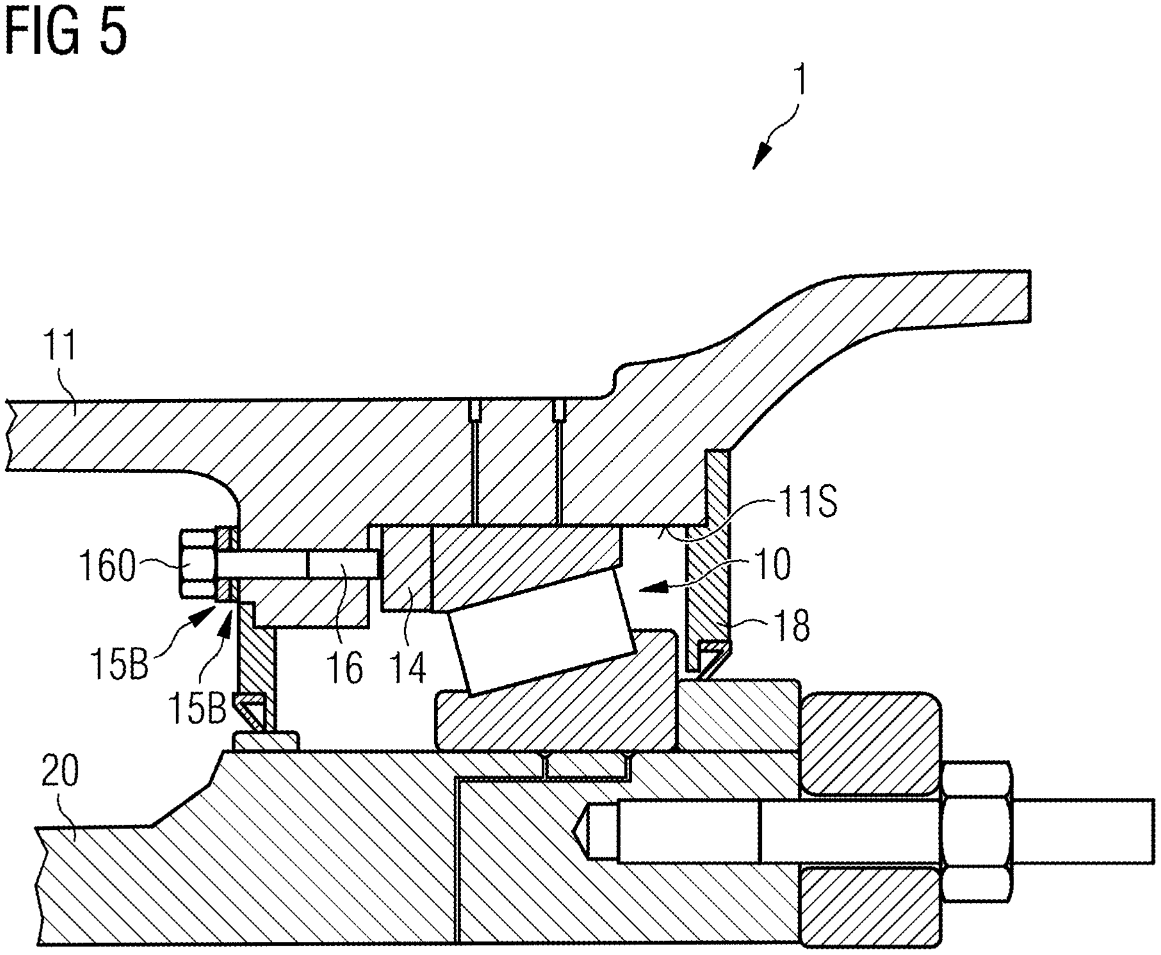
FIG. 5 illustrates a first embodiment of the inventive main bearing unit in which shims are removed during a preload reinstatement procedure.
Figure 6:
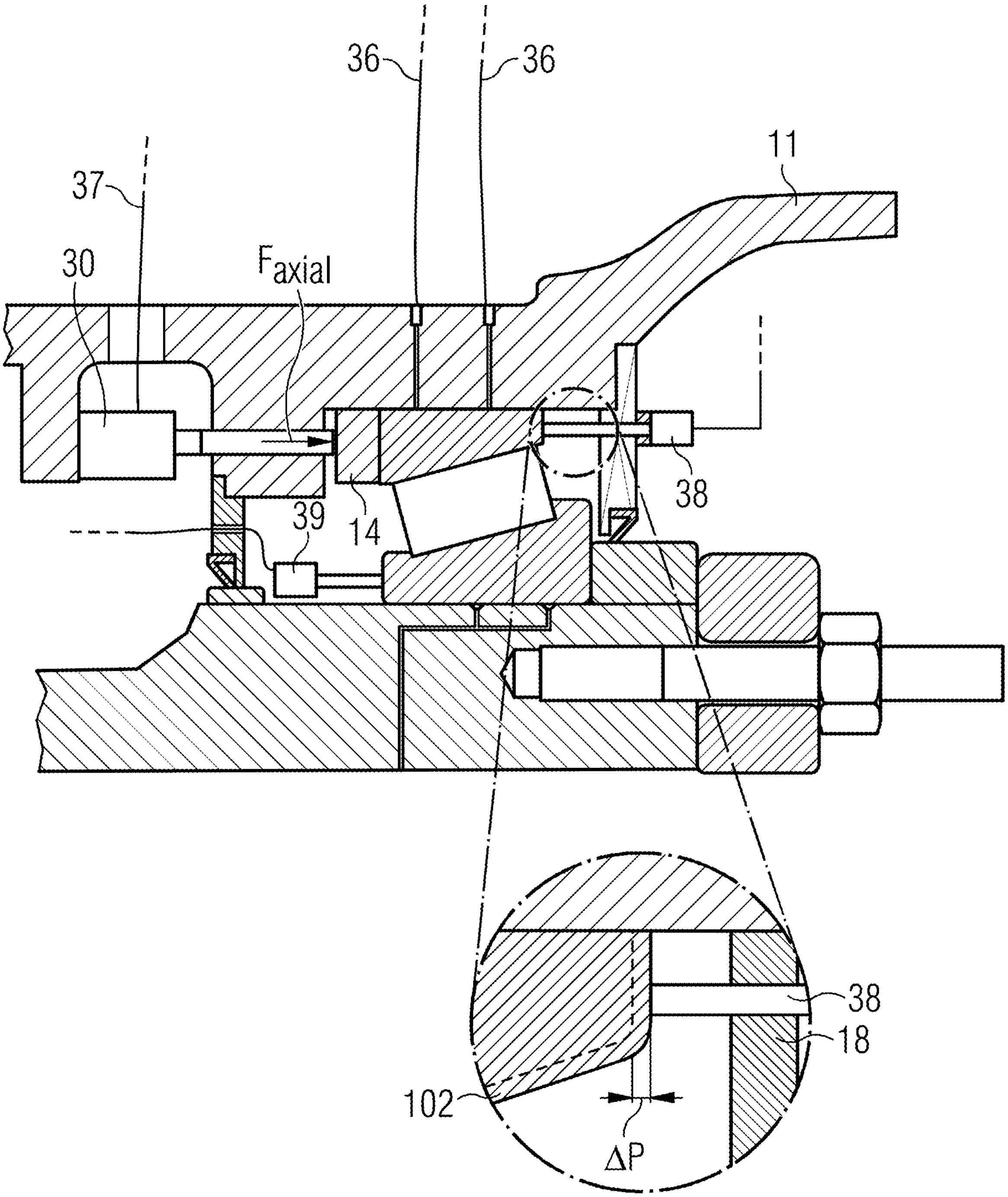
FIG. 6 illustrates the first embodiment of the inventive main bearing unit in which shims are removed during a preload reinstatement procedure.
Figure 7:
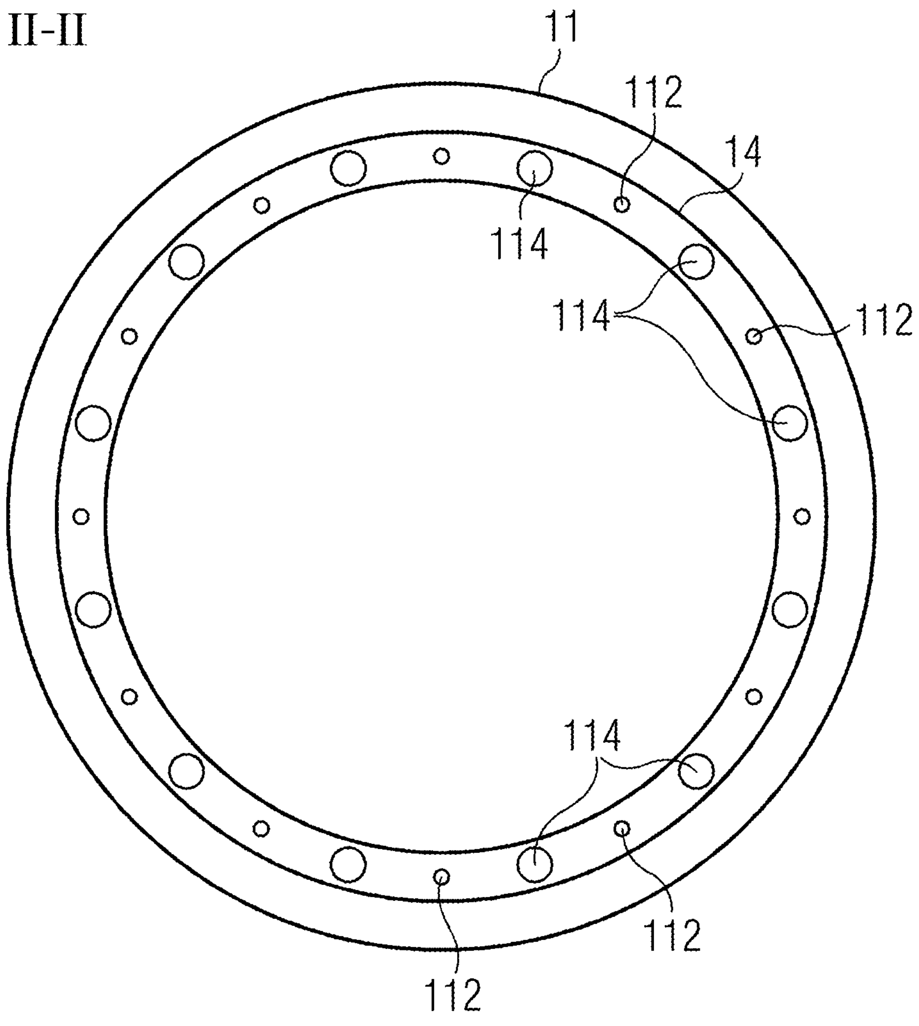
FIG. 7 illustrates the first embodiment of the inventive main bearing unit in which shims are removed during a preload reinstatement procedure.

FIGS. 5-7 illustrate an embodiment of the inventive main bearing unit in which shims 15B are removed during a preload reinstatement procedure. FIG. 7 is a simplified view of the main bearing unit 1 in cross-section II-II (looking in the upwind direction) to illustrate how the housing 11 may be designed to have an inwardly-projecting housing flange 115 with an annular arrangement of bores 112 (twelve in this case) to receive threaded stud bolts 16, and a further annular arrangement of larger bores 114 (a matching number in this exemplary case), each of which is wide enough to allow a hydraulically-operated tool to exert a force against the preload ring 14 as shown in FIG. 6. Initially, as shown in FIG. 5, one or more shims 15B are placed under the head 160 of each bolt 16, with a suitable total shim thickness. The stud bolts 16 are tightened so that the bolt ends exert an axially directed force $F_{axial}$ against the preload ring 14, to result in the desired preload force $F_{preload}$ on the bearing 10. This is generally done at the manufacturing facility.

In a preload reinstatement procedure carried out at some time during the service life of the wind turbine, a hydraulic system 3 such as described in FIG. 2 may be deployed to establish a fluid cushion as described above between housing 11 and bearing cup 102, and to control the hydraulic jacks 30 to force the preload ring 14 (and the bearing cup 102) by a desired amount AP in the downwind direction as indicated in FIG. 6. Subsequently, the stud bolts 16 can be removed, and the previous set(s) of shims 15B can be replaced by a thinner shim or a thinner shim stack to decrease the shim depth by the axial displacement amount ΔP. The stud bolts 16 now be tightened again, and the hydraulic jacks 30 can be removed. The controller 31 is actuated to remove the fluid cushion between housing 11 and bearing cup 102, thereby completing the preload reinstatement procedure.

In an alternative approach, a set of stud bolts could be used to push the preload ring to the downwind side to achieve a desired increase in bearing preload force. For example, after removing shims from underneath the bolt heads, the stud bolts could be simultaneously turned using suitable equipment to effect the desired axial displacement of the bearing cup.

As explained above, in a mirrored configuration, the main bearing unit 1 can equally be equipped with a preload ring placed to reinstate preload force on the front bearing. The drawings also indicate channels in the main shaft, used at the manufacturing facility to establish a fluid cushion while setting the initial preload force $F_{preload}$ of a bearing, as will be familiar to the skilled person.

Figure 8:
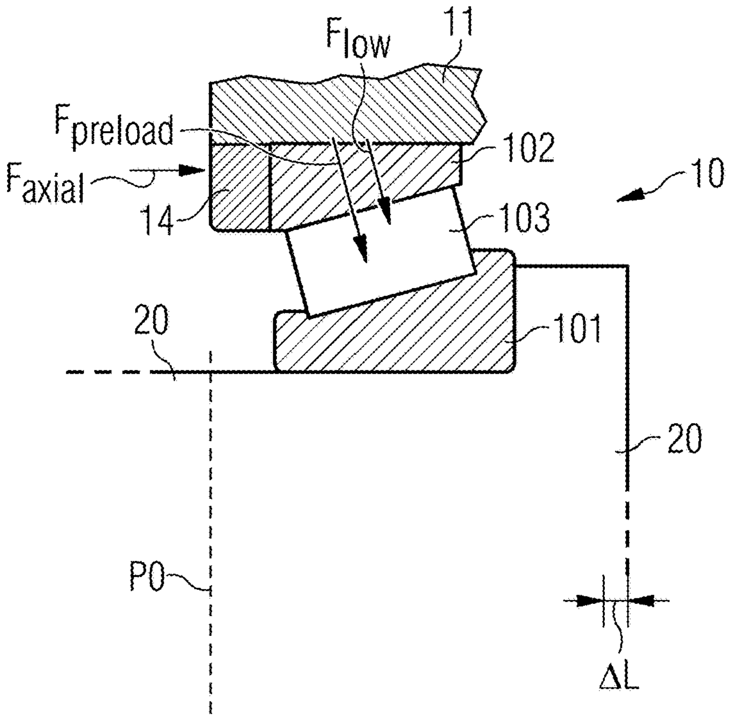
FIG. 8 illustrates a stage during the inventive preload reinstatement procedure.
Figure 9:
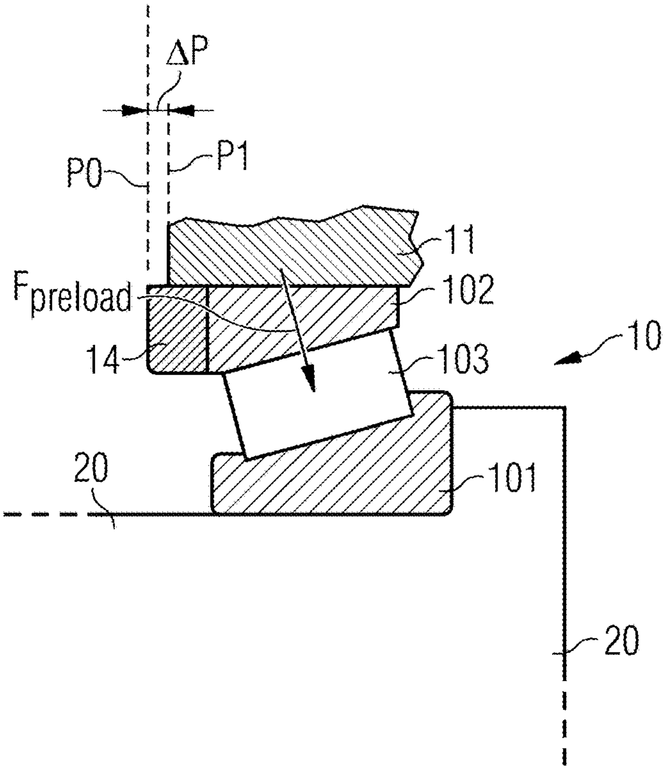
FIG. 9 illustrates a stage during the inventive preload reinstatement procedure.

FIGS. 8 and 9 illustrate the inventive approach to reinstating the bearing preload, in this case for the rear bearing as described in FIGS. 2-7. During the service life of a wind turbine, the bearing preload of the rear bearing is monitored at intervals. From a measured shaft elongation ΔL, the reduction in bearing preload force (from its initial value $F_{preload}$) can be computed. FIG. 8 schematically indicates the initial bearing preload force $F_{preload}$ and the reduced bearing preload force $F_{low}$ (as indicated by the shorter arrow). In FIG. 9, after axially displacing the bearing cup 102 from its initial position P0 to a final position P1 as explained in FIGS. 2-7 above, the reinstated bearing preload force $F_{preload}$ is essentially the same as the initial bearing preload force $F_{preload}$. The wind turbine can continue to operate without risk of damage to the bearing 10. These diagrams show a preload ring 14 arranged to abut the back face of the bearing cup 102, but it shall be understood that the axially directed force $F_{axial}$ can be applied directly to the bearing cup back face 102F.

Figure 10:
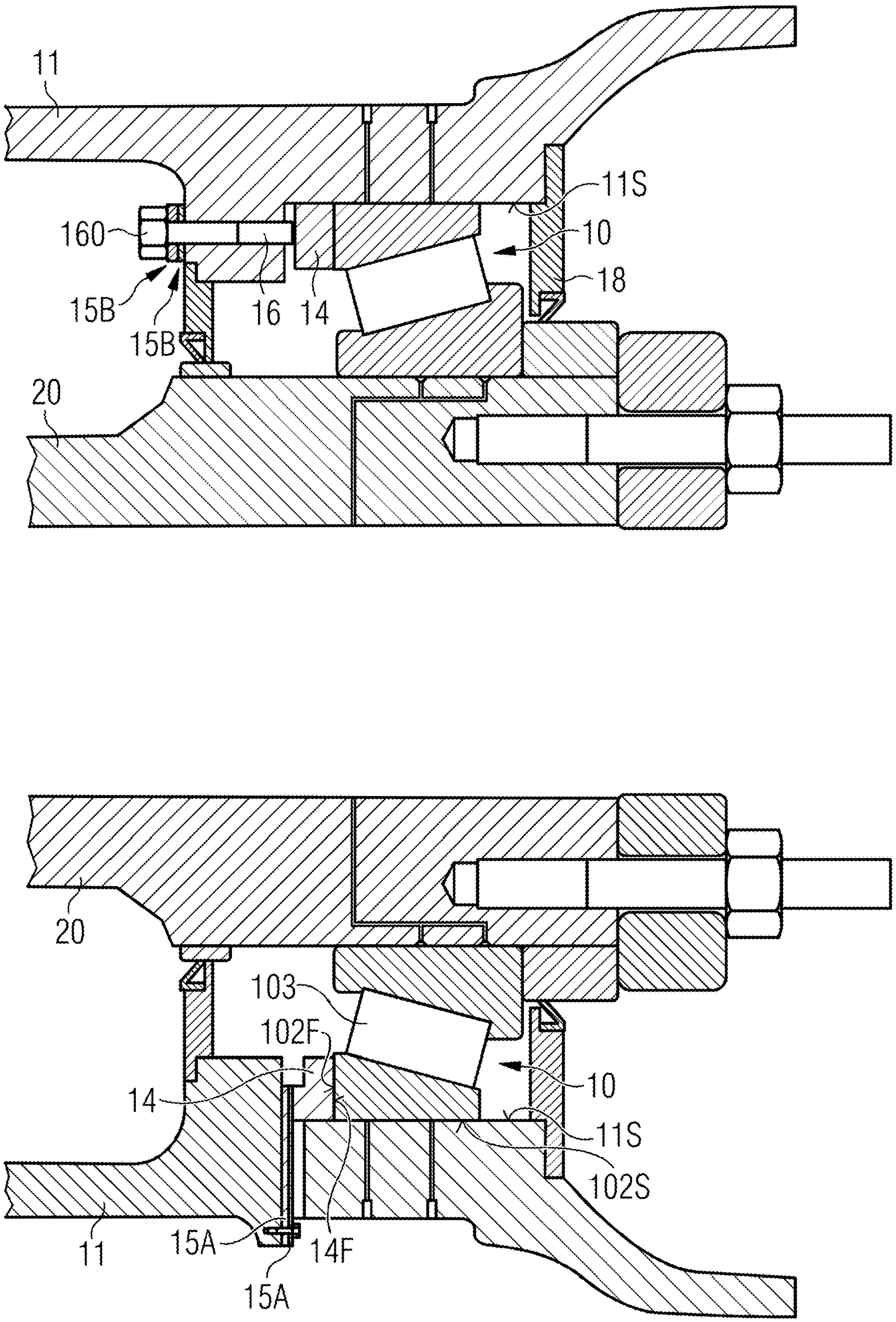
FIG. 10 illustrates an embodiment of the invention.

FIG. 10 illustrates an further embodiment of the invention, showing the upper and lower parts of the main bearing unit in partial cross-section. Here, the initially established bearing preload force $F_{preload}$ is maintained by the press-fit between bearing cup 102 and housing 11, and also by an arrangement of shims. The upper part of the diagram shows a stud bolt 16 arranged in an axial bore 112 formed in the flange 115 and tightened to apply an axial force $F_{axial}$ against the bearing cup back face 102F. Here, a shim set 15B is arranged beneath the stud bolt head 160. This shim set 15B can be used to achieve the preload force $F_{preload}$ during a manufacturing stage of the main bearing unit. The lower part of the diagram shows a shim set 15A arranged between a housing flange 115 and the bearing cup back face 102F. These shims 15A can have been added during a preload reinstatement procedure during the service life of the wind turbine. Of course, such a combination of shim sets 15A, 15B can also be implemented in an embodiment that deploys a preload ring 14 as described in FIGS. 2-9 above.

Figure 11:
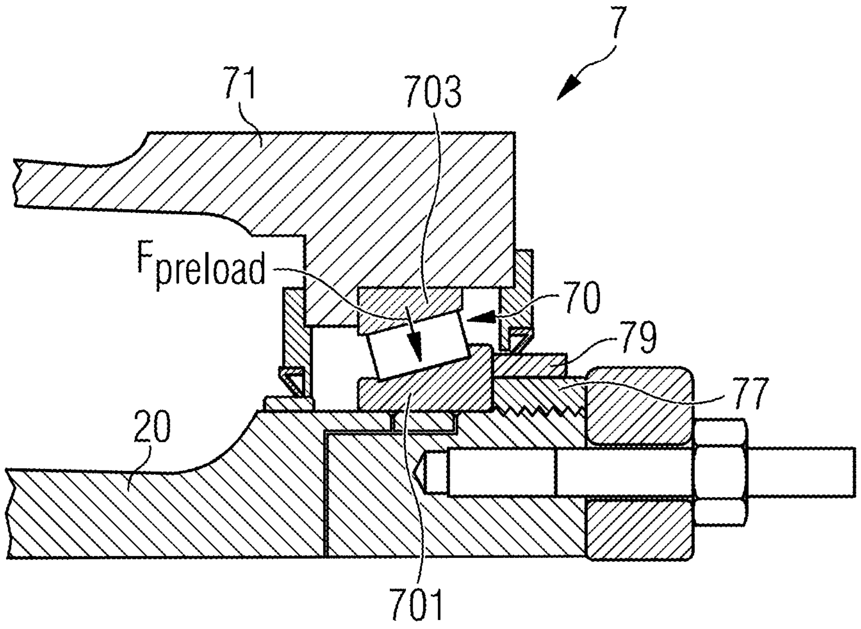
FIG 11 PRIOR ART
FIG. 11 shows a rear bearing in a prior art main bearing unit.

FIG. 11 shows a prior art rear bearing 70 of a main bearing unit 7, showing elements relevant to preloading the rear bearing 10. The position of the bearing cup 703 is fixed by a housing feature. The position of the bearing cone 701 on the low-speed shaft is fixed by a lock nut 77 and a press-fit ring 79. The shaft 20 and lock nut 77 each have a matching trapezoidal thread. During assembly of the prior art main bearing unit 7 at the manufacturing facility, and after the housing 71 is put in place about the shaft and bearings 70, bearing preload can be achieved by stretching the shaft 20, for example with a hydraulic tool, while fixing the position of the rear bearing 70 relative to the housing 71, in a procedure that will be known to the skilled person. To this end, a press-fit between the rear bearing inner ring 701 and the shaft 20 is relieved, for example by forcing pressurized fluid through passages to form a fluid "cushion" between the contact surfaces of the inner ring 701 and shaft 20. To this end, a suitable configuration of ducts or passages are provided in the body of the main shaft 20 as indicated. During the preload procedure, the shaft 20 and bearing inner ring 701 must be rotated relative to the housing 71 in order to avoid damage to the bearing rollers 703 and raceways, and the tools used for this procedure are constructed to facilitate this rotation. After deactivating the shaft stretching tool and removing the fluid cushion to restore the press-fit between shaft 20 and bearing inner ring 701, the new position of the bearing 70 is fixed by the reinstated press-fit and by turning the lock nut 77 about the low-speed shaft 20. The main bearing unit 7 can now be transported to a wind turbine for installation inside a nacelle. During the service life of the wind turbine, the bearing preload force $F_{preload}$ can be reinstated by removing the press-fit ring 79, turning the lock nut 77 by a suitable amount, and replacing the press-fit ring 79. However, on account of the large dimensions involved, it is challenging and very expensive to form the trapezoidal threads about the shaft 20 and lock nut 77 to the desired degree of accuracy, and this aspect of the drivetrain design adds significantly to the overall manufacturing and maintenance costs. While the same approach of stretching the shaft 20 could be used to reinstate bearing preload at a later stage in the lifetime of the wind turbine, it is difficult to install the necessary tools in an operational drivetrain. It would be prohibitively difficult to dismantle the necessary equipment and transport it to a wind turbine site for installation in the nacelle. Furthermore, the main shaft 20 must be rotated during the preloading procedure as explained above but is now enclosed in the housing 11 so that tools used at the manufacturing facility (to stretch the shaft 20 and to generate a fluid cushion in the press-fit region between shaft and bearing) cannot simply be deployed in the nacelle of an operational wind turbine. Also, it would be necessary to provide some retaining the rear bearing at its new position on the shaft. For example, retaining the rear bearing at its new position on the shaft could be accomplished by turning the trapezoidal-threaded nut 77 on the shaft. However, such a solution is difficult to implement.

Alternatively, the main bearing unit 7 could be equipped with an adjustable locking means such as an arrangement of fasteners between the shaft 20 and the inner ring 701 of the rear bearing 70. Any such arrangement of fasteners must be accessible to a technician during the preloading procedure, and the necessary redesign of the main bearing unit 7 would add significantly to the overall cost.

Although the present invention has been disclosed in the form of embodiments and variations thereon, it will be understood that numerous additional modifications and variations could be made thereto without departing from the scope of the invention. For example, the position of the preload ring relative to a bearing can be exploited by attaching a seal directly to the preload ring, so that it is not necessary to form a housing feature to support the seal.

For the sake of clarity, it is to be understood that the use of "a" or "an" throughout this application does not exclude a plurality, and "comprising" does not exclude other steps or elements.

The invention claimed is:

1. A main bearing unit of a wind turbine drivetrain, comprising

- a tapered roller bearing arranged between a housing of the main bearing unit and a low-speed shaft of the wind turbine drivetrain;
- a press-fit connection between an inner surface of the housing and an outer surface of a bearing cup; and
- a means of facilitating an axial displacement of the bearing cup to reinstate preload force on the tapered roller bearing.

2. The main bearing unit according to claim 1, further comprising a preload ring arranged to abut a bearing cup back face.

3. The main bearing unit according to claim 2, wherein the preload ring is arranged to abut the bearing cup back face at a non-drive end of the low-speed shaft; and/or the preload ring is arranged to abut the bearing cup back face of the tapered roller bearing at a drive end of the low-speed shaft.

4. The main bearing unit according to claim 1, wherein a position of the bearing cup is fixed by an inwardly projecting housing flange and a set of shims.

5. The main bearing unit according to claim 1, further comprising an annular arrangement of openings in the housing, and wherein each shim of the set of shims is arranged in an opening.

6. The main bearing unit according to claim 5, wherein each shim extends:

between the inwardly projecting housing flange and the bearing cup back face; or between the inwardly projecting housing flange and a preload ring arranged to abut the bearing cup back face.

7. The main bearing unit according to claim 1, further comprising an annular arrangement of threaded bores formed in a flange to receive a set of adjustment screws, and wherein an end face of each adjustment screw exerts a force:

against a bearing cup back face; or against a preload ring arranged to abut the bearing cup back face.

8. The main bearing unit according to claim 7, wherein each shim of a shim set is arranged about a shank of a respective adjustment screw.

9. The main bearing unit according to claim 1, wherein the means of facilitating the axial displacement comprises a hydraulic circuit including a pump, a control valve arrangement, hydraulic lines, and passages in the housing arranged to convey pressurized fluid to one or more regions between the inner surface of the housing and the outer surface of the bearing cup to relieve a radial press-fit force during a bearing preload reinstatement procedure.

10. The main bearing unit according to claim 1, comprising a plurality of passages arranged to facilitate formation of a fluid cushion between the inner surface of the housing and the outer surface of the bearing cup.

11. The main bearing unit according to claim 10, wherein the plurality of passages are arranged to facilitate formation of a plurality of individually configurable fluid cushions.

12. A method of reinstating a preload force in a bearing of a main bearing unit according to claim 1, comprising:

relieving a press fit force between the housing and the outer surface of the bearing cup;

applying an axial force to a bearing cup back face to effect a displacement of the bearing cup from an initial position to a final position; and fixing the bearing cup at the final position.

13. The method according to claim 12, wherein the relieving the press fit force between the housing and the outer surface of the bearing cup comprises establishing a fluid cushion between the housing and the outer surface of the bearing cup.

14. The method according to claim 12, wherein fixing the bearing cup at the final position comprises adjusting one or more shim sets by inserting shims of an additional shim set between an inwardly-projecting housing flange and a preload ring and/or the bearing cup.

15. The method according to claim 12, wherein fixing the bearing cup at the final position comprises adjusting one or more shim sets by removing a set of shims from between heads of adjustment screws and an inwardly-projecting housing flange.

16. A main bearing unit of a wind turbine drivetrain, comprising:

a tapered roller bearing arranged between a housing of the main bearing unit and a low-speed shaft of the wind turbine drivetrain;

a press-fit connection between an inner surface of the housing and an outer surface of a bearing cup; and a hydraulic circuit configured to facilitate axial displacement of the bearing cup to reinstate preload force on the tapered roller bearing, and passages in the housing arranged to convey pressurized fluid from the hydraulic circuit to one or more regions between the inner surface of the housing and the outer surface of the bearing cup to create a fluid cushion therebetween.

* * * * *